P. SHAW.
Car Seat.
No. 89,086.
Patented April 20, 1869.
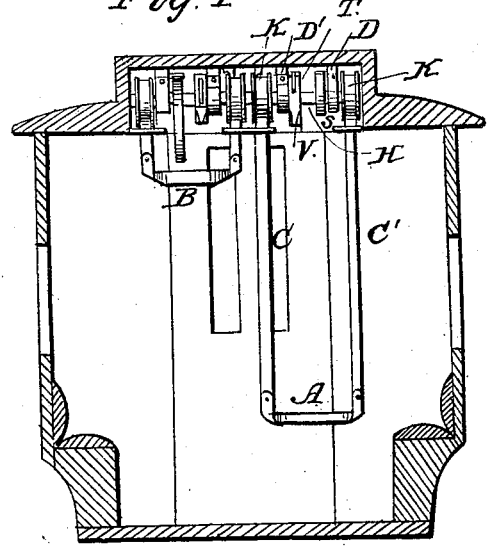
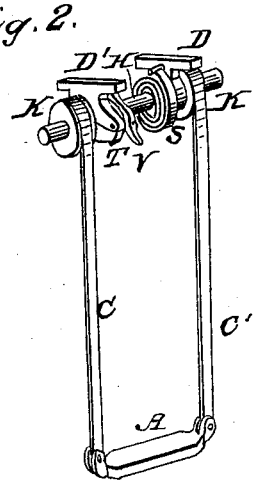
Witnesses
Frank G Parker
Arthur Berry
Inventor
Philander Shaw

PHILANDER SHAW, OF BOSTON, MASSACHUSETTS.

Letters Patent No. 89,086, dated April 20, 1869.

IMPROVEMENT IN STREET-CARS.

The Schedule referred to in these Letters Patent and making part of the same.

*To all whom it may concern:*

Be it known that I, PHILANDER SHAW, of Boston, in the county of Suffolk, and State of Massachusetts, have invented certain new and useful Improvements in Supplemental Car-Seats; and I do hereby declare that the following is a full and exact description thereof, reference being had to the accompanying drawings, and to the letters of reference marked thereon.

To enable others skilled in the art to make and use my invention, I will proceed to describe its nature, construction, and use.

The nature of my invention consists in suspending from the top of a car extra seats, so arranged that when desirable they may be let down for use, and when not in use, may be raised out of the way of the passengers.

Drawings.

Figure 1 represents a section of a car, showing two suspended seats, one of which is let down ready for use, the other being drawn up out of the way.

Figure 2 represents in perspective the seat and its suspending-device.

I construct my device as follows:

D D' represent housings, secured to the top of the car.

H is a shaft or journal, held by said housings.

K K' are two pulleys attached to said shaft, and revolving with it.

These pulleys are provided with grooves, in which the suspending straps C C' are wound.

S is a volute spring, one end of which is attached to the shaft H, and the other end to the housing D.

This spring is so arranged, in connection with the shaft H, pulleys K K', and straps C C', that, left free to act, it will always wind up the straps C C' and thus draw up the seat A.

T is a ratchet-wheel, attached to the shaft H;

V being a pawl, attached to the housing D', the ratchet and pawl being so arranged that they may check the action of the spring, and thus prevent it from drawing up the seat when it is desirable that the seat should remain down.

What I claim as my invention, and desire to secure by Letters Patent, is—

In a car or other vehicle, a series of suspended seats, arranged to operate substantially as described, and for the purpose set forth.

PHILANDER SHAW.

Witnesses:
WILLIAM EDSON,
FRANK G. PARKER.